United States Patent [19]

Choudhury et al.

[11] Patent Number: 5,541,912
[45] Date of Patent: Jul. 30, 1996

[54] DYNAMIC QUEUE LENGTH THRESHOLDS IN A SHARED MEMORY ATM SWITCH

[75] Inventors: Abhijit K. Choudhury, Scotch Plains; Ellen L. Hahne, Westfield, both of N.J.

[73] Assignee: AT&T Corp., Murray Hill, N.J.

[21] Appl. No.: 318,007

[22] Filed: Oct. 4, 1994

[51] Int. Cl.$^6$ ............................ H04L 12/26; H04L 12/56
[52] U.S. Cl. ........................ 370/17; 370/60.1; 370/61; 370/85.6; 370/94.2; 340/825.5; 395/427
[58] Field of Search ............................ 370/13, 17, 60, 370/60.1, 61, 85.2, 85.6, 94.1, 94.2, 118; 340/825.5, 825.51, 825.52; 395/425

[56] References Cited

U.S. PATENT DOCUMENTS

| | | | |
|---|---|---|---|
| 5,014,265 | 5/1991 | Hahne et al. | 370/60 |
| 5,072,443 | 12/1991 | Hahne et al. | 370/85.9 |
| 5,115,430 | 5/1991 | Hahne et al. | 370/85.6 |
| 5,128,937 | 7/1992 | Khalil | 370/85.6 |
| 5,136,584 | 8/1992 | Hedlund | 370/94.1 |
| 5,163,046 | 11/1992 | Hahne et al. | 370/79 |
| 5,193,090 | 3/1993 | Filipiak et al. | 370/94.1 |
| 5,233,606 | 8/1993 | Pashan et al. | 370/85.6 |
| 5,272,697 | 12/1993 | Fraser et al. | 370/61 |
| 5,278,828 | 1/1994 | Chao | 370/85.6 |
| 5,278,969 | 1/1994 | Pashan et al. | 395/425 |
| 5,280,470 | 1/1994 | Buhrke et al. | 370/13 |
| 5,285,441 | 2/1994 | Bansal et al. | 370/16 |
| 5,289,303 | 2/1994 | Cloonan et al. | 370/60 |

OTHER PUBLICATIONS

M. I. Irland, "Buffer Management in a Packet Switch", IEEE TRANS. ON COMMUNICATIONS, vol. COM–26, No. 3, Mar. 1978, pp. 328–337.

E. L. Hahne et al., "DQDB Networks With and Without Bandwidth Balancing", IEEE Trans. On COMMUNICATIONS, vol. 40, No. 7, Jul. 1992, pp. 1192–1204.

A. K. Choudhury et al., "Space Priority Management in a Shared Memory ATM Switch", PROC. GLOBECOM '93, Houston, Texas, Dec. 1993, pp. 1–9.

K. Y. Eng et al., "A High–Performance Prototype 2.5 Gb/s ATM Switch for Broadband Applications", PROC. IEEE GLOBECOM '92, vol. 1, pp. 111–117, Orlando, Florida, Dec. 1992.

H. Jonathan Chaco and I. Hakan Pekcan, "Queue Management with Multiple Delay and Loss Priorities for ATM Switches", New Orleans SuperCom/ICC '94, May 1994, pp. 1184–1189.

D. Tipper et al., "Adaptive Policies for Optimal Buffer Management in Dynamic Load Environments", PROC. IEEE INFOCOM '88, pp. 535–544.

A. K. Thareja et al., "Buffer Sharing in Dynamic Load Environment", PROC. IEEE INFOCOM '84, pp. 369–379.

Primary Examiner—Alpus H. Hsu

[57] ABSTRACT

A dynamic threshold system and method is disclosed for allocating memory among different output queues in a shared-memory ATM switch. The maximum permissible length for any individual queue at any instant of time is a function of the unused buffering in the switch. The dynamic threshold system and method deliberately reserves a small amount of buffer space, not allocating it to any currently active output queue, but attempts to equally share the remaining buffer space among the currently active output queues. The dynamic threshold system and method improve fairness and switch efficiency by guaranteeing access to the buffer space for all output queues, and by preventing any single output queue from monopolizing the memory at the expense of the others. The dynamic threshold system and method adapt to uncertain or changing load conditions. The packet losses that occur with dynamic thresholds tend to be clustered at a few offending queues, which is desirable in ATM systems, since it results in fewer messages being disturbed at higher protocol layers and, hence, fewer message retransmissions. The dynamic threshold system and method are also extendable to handle traffic with multiple space priorities.

38 Claims, 3 Drawing Sheets

5,541,912

DYNAMIC QUEUE LENGTH THRESHOLDS IN A SHARED MEMORY ATM SWITCH

BACKGROUND OF THE INVENTION

1. Field of the Invention

This disclosure relates to packet-switched communications systems. More particularly, this disclosure is directed to a dynamic threshold system and method for regulating the queue lengths in a shared-memory asynchronous transfer mode (ATM) switch.

2. Description of the Related Art

Communication systems often require optimal allocation of resources such as available memory or bandwidth for reliable and/or efficient communications or to maximize channel capacity. The conventional approach is to use all of the available memory or bandwidth, as memory and bandwidth are generally limited.

Advantages may be obtained by purposefully not utilizing a portion of the memory or bandwidth. For example, as described in E. L. Hahne et al., "DQDB Networks With and Without Bandwidth Balancing" IEEE TRANS ON COMMUNICATIONS, VOL. 40, NO. 7, pp. 1192–1204, a distributed queue dual bus (DQDB) network protocol implements bandwidth balancing to equalize throughput by allocating a small amount of bus bandwidth in order to facilitate coordination among nodes currently using that bus. A maximum permissible nodal throughput rate is proportional to the unused bus capacity.

In the field of switched broadband ISDN (BISDN), asynchronous transfer mode (ATM) packet switching may be implemented using a shared-buffer-memory-based architecture, where incoming packets destined for different output ports are buffered in queues corresponding to those ports and the queues share a common memory.

As memory is limited, various arrangements have been developed to maximize memory capacity and to address memory overflow. Such an arrangement is described in commonly assigned U.S. Pat. No. 5,233,606 to Pashan et al.

In a shared-memory ATM switch with no buffer management procedures, a small number of output port queues may occupy a large portion of memory, so that other output ports may not be able to acquire enough memory to function efficiently. The throughput of the starved output queues may thus be diminished and their packet loss rates increase. The resulting service is unfair, and overall system efficiency can also suffer.

By adapting the approach of purposefully not utilizing a portion of memory, in a manner similar to the E. L. Hahne reference above for bandwidth balancing, a fairer and overall more efficient system may be achieved.

SUMMARY

A system is disclosed for allocating memory space to queues in an asynchronous transfer mode (ATM) switch, including an ATM switch having a processor with stored programs, a shared memory, and a plurality of input and output ports. As instructed by the processor, the ATM switch receives a plurality of packets on its input ports, stores these packets temporarily in the memory, and transmits each packet on an appropriate output port.

The memory is configured for storing the packets in a plurality of queues, where each queue is associated with packets received for a corresponding one of the output ports. All the output port queues share the memory space in common.

The processor is configured for computing availability values based upon the total occupancy of the memory, for computing control thresholds as functions of these availability values, for computing output port queue lengths, for comparing the output port queue lengths to the control thresholds, and for controlling admittance of packets to the output port queues based on these comparisons.

When deciding whether to accept a packet, the particular availability value and, hence, the particular control threshold used by the processor, may depend on the priority of the packet.

A method is also disclosed for allocating memory space in a shared-memory ATM switch, including the steps of: maintaining a count of the length of each output port queue; maintaining a set of control thresholds, one for each packet priority level; and regulating the admission of packets to the memory. The step of maintaining the control thresholds involves performing the following steps whenever the occupancy of the shared memory changes (due to a packet being written into or read out from any output port queue in the shared memory): updating a set of availability values based upon the occupancy of the memory, with one availability value for each packet priority level; and computing each control threshold as a function of the corresponding availability value. The step of regulating the admission of a packet includes: receiving a packet at an input port; determining the priority of the packet; determining the output port for the packet; determining the length of the corresponding output port queue; determining an appropriate control threshold based on the packet priority; comparing the output port queue length to the control threshold; and, if this comparison is favorable, storing the packet in its output port queue. Inserting the packet into its output port queue causes the maintenance steps to update the length count for that output port queue and to update the availability values and control thresholds for all priority levels.

BRIEF DESCRIPTION OF THE DRAWINGS

The features of the disclosed dynamic threshold system and method will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 1:
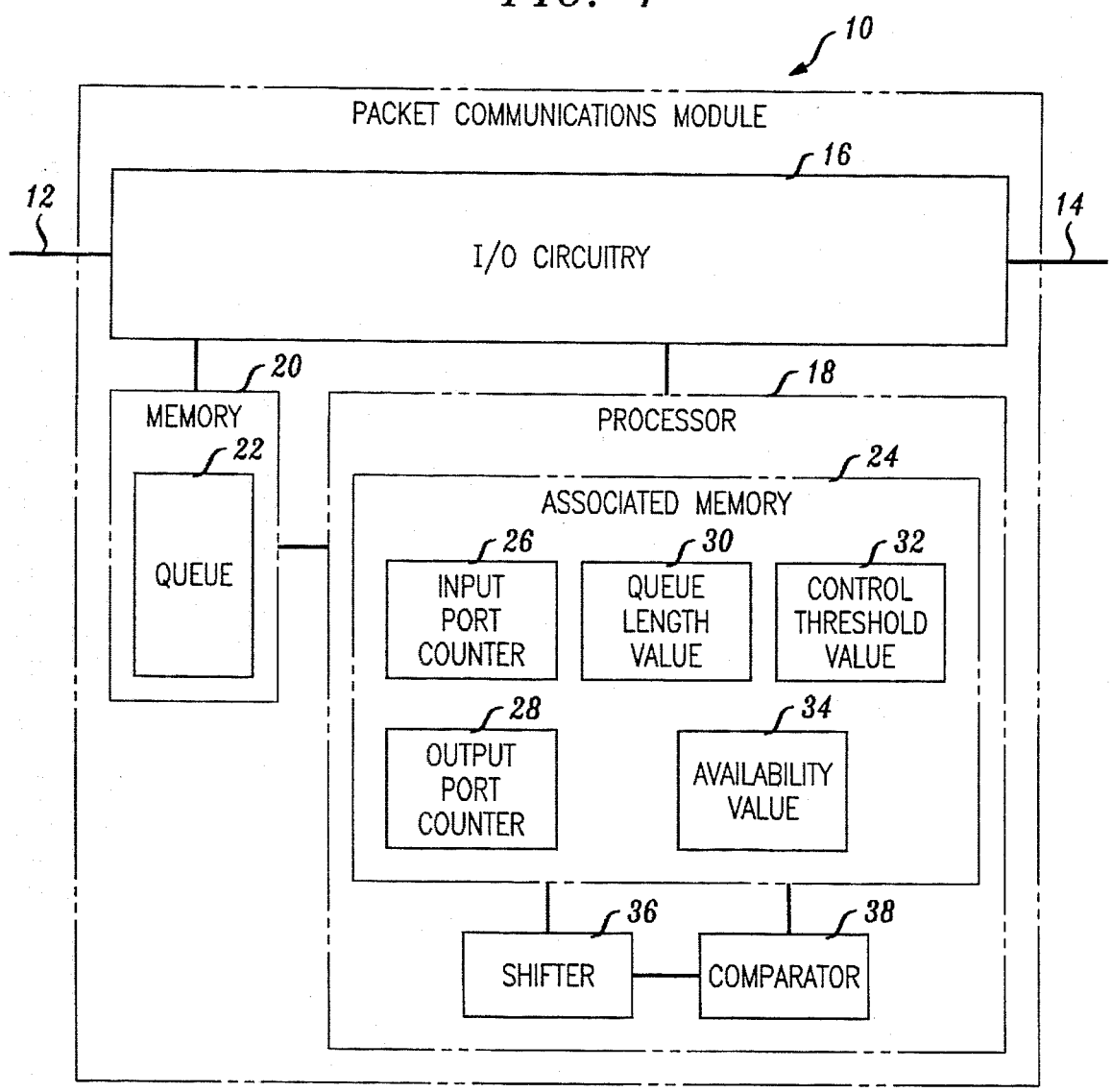
FIG. 1 illustrates a block diagram of the components of the packet communications module using the disclosed dynamic threshold system and method.

Referring now in specific detail to the drawings, with like reference numerals identifying similar or identical elements, as shown in FIG. 1, the present disclosure describes a shared-buffer-memory-based packet communications module 10 for processing packets, which are herein defined as units of data that are addressed with routing information. In the context of packet processing systems, the packets are allowed to be of any length, or may be of a length not greater than a predetermined maximum.

In the exemplary embodiment described herein, the disclosed dynamic threshold system and method are illustrated for a packet switch with multiple input ports and multiple output ports, such as an asynchronous transfer mode (ATM) switch, using fixed length packets. For example, the packets may be fixed to be exactly 53 bytes long, where such 53 byte long packets are termed "cells". Alternatively, the packets in a higher protocol layer may have a longer length and are termed "messages" which may be subdivided to generate a plurality of cells for ATM switching.

It is understood that other packet lengths, including packets of variable length, may be processed by the disclosed dynamic system and method.

The present disclosure describes an exemplary embodiment of a shared memory ATM switch implementing the dynamic threshold system and method. In alternative embodiments, the disclosed dynamic threshold system and method may also be used in conjunction with multiple-input, single-output packet systems (i.e., multiplexers) and single-input, multiple-output packet systems (i.e., demultiplexers). For multiplexers, the dynamic thresholds would be used to allocate memory among packets received from competing input ports.

In the exemplary embodiment, the disclosed packet communications module 10, as a shared memory ATM switch, is connected to one or more input ports 12 over which module 10 receives incoming packets, with individual packets having a priority level. The packet communications module 10 is also connected to one or more output ports 14 for outputting the switched packets. Input ports are connected to input and output (I/O) circuitry 16 which couples input ports to a processor 18 and a memory 20.

ATM switches are well known in the art. In the exemplary embodiment of the packet communications module 10 as an ATM switch, the I/O circuitry 16 may include such mechanisms as phase-alignment circuitry, serial-to-parallel and parallel-to-serial shift registers. Copies of header portions of incoming packets received from input ports are sent by I/O circuitry 16 to processor 18, and the packets are sent by I/O circuitry 16 to memory 20 for storage.

The shared memory 20 shown in FIG. 1 may be embodied as one or more RAMs that implement at least one queue 22 as an output port queue, with each output port queue dedicated to a specific output port. In an exemplary embodiment, the queues 22 in FIG. 1 are preferably implemented as logical queues in the form of linked lists, but in alternative embodiments, the queues 22 may be implemented as physical queues or some other data structures in memory 20. A count for the queue length may be implemented for each queue by the processor 18.

Referring again to FIG. 1, processor 18 controls storage of incoming packets in memory 20 and transmission of stored packets at the output ports. In the exemplary embodiment disclosed herein, the processor 18 may include associated memory 24 and control logic to maintain an input port counter 26, an output port counter 28, a queue-length counter 30, a control threshold value 32, and an availability value 34. A shifter 36 may be included as a register in the processor 18 or in the associated memory, and a comparator 38 may be included or implemented by the processor 18.

In another exemplary embodiment, an admission table (not shown) may be used to store and track the status of each queue according to packet priority values.

Based on the header of an incoming packet, received from I/O circuitry 16, the processor 18 determines the priority and the destination output port of the received packet. The input port counter 26 determines which input port to read and when to read the received packets therefrom.

Then the processor 18 causes the packet to be stored in a corresponding output port queue in memory 20, and increments that queue's corresponding length count in counter 30. The processor 18 also periodically accesses the output port queue that is identified by the present count of the output-port counter 28, retrieves therefrom an packet that is at the head of the queue, decrements that queue's corresponding length counter 30, and causes I/O circuitry 16 to transmit the retrieved packet on the corresponding one of the output ports.

The processor 18 allows the output queues 22 to occupy memory 20 in a conventional manner using procedures known in the art implemented either in hardware or in software.

The dynamic threshold system and method described herein regulate the sharing of memory among different output queues in the shared memory ATM switch module 10 by having the maximum permissible length for any individual queue at any instant of time be a function of the available buffer space in the shared memory 20. While many functions may be implemented, the preferred embodiment of the dynamic threshold system and method disclosed herein uses a linear function; for example the maximum permissible queue length is a proportion or fraction of the available memory, with a predetermined constant of proportionality. The dynamic threshold system and method presented herein improves fairness and switch efficiency by guaranteeing access to the buffer space for all output queues. As disclosed herein, the dynamic threshold system and method may be adapted to handle packets of different space priority classes, providing better loss performance to higher priority packets.

The instantaneous proportionality of queue lengths to unused buffering in the ATM switch 10 is similar to bandwidth balancing in Distributed Queue Dual Bus (DQDB) networks as described above. The dynamic threshold system and method deliberately does not utilize a small amount of buffer space in memory 20, and attempts to equally share the remaining buffer space among the active output queues.

The dynamic threshold system and method is expected to improve fairness and switch efficiency by guaranteeing access to the buffer space for all output queues. In addition, the packet losses that occur with dynamic thresholds tend to be clustered at a few offending queues. This is a desirable feature in ATM systems, since it results in fewer messages being disturbed at higher protocol layers, and, hence, fewer message retransmissions. Dynamic thresholds are relatively easy to implement because packets are dropped before entering the buffer. Dynamic thresholds perform better than static thresholds because dynamic thresholds adapt to uncertain or changing load conditions.

SINGLE-PRIORITY DYNAMIC QUEUE THRESHOLDS

In the present disclosure, the dynamic threshold system and method for an ATM switch is described without space (loss) priorities. When an ATM switch is overloaded, it is desirable to divide the memory fairly among the active output queues. All queues with sufficient traffic to warrant thresholding should obtain the same amount of space, called the control threshold. The control threshold value is determined by monitoring the total amount of unused buffer space in the shared memory.

The dynamic threshold system and method attempts to limit each output queue length to some function f of the unused buffer space, and output queues with less demand than this can have all the space they need. At time t, let T(t) be the control threshold and let $Q^i(t)$ be the length of queue i. Let Q(t) be the sum of all the queue lengths, i.e. the total occupancy of the shared memory. Then, if B is the total buffer capacity of the shared memory is $$T(t) = f(B - Q(t)) \quad (1)$$

The simplest method is to set the control threshold to a multiple (or, alternatively, a fraction) of the unused buffer space by $$T(t) = \alpha \cdot (B - Q(t)) \quad (2)$$

which is stored in a register 32 in the associated memory 24 of the processor 18 as shown in FIG. 1, where the factor $\alpha$ is a constant of proportionality. As used herein, the term "multiple" is understood to include fractional values where $\alpha < 1$.

It is contemplated that, in alternative embodiments, other linear functions as well as non-linear functions may be implemented as per Eq. (1) above.

An arriving packet for queue i is blocked at time t if $Q^i(t) \geq T(t)$. All packets going to this queue are blocked until the queue length drops below the control threshold.

Whenever the load changes, the dynamic threshold system goes through a transient response. For example, when a lightly loaded output queue suddenly becomes active, the total buffer occupancy goes up, the control threshold goes down, and queues exceeding the threshold have their arrivals blocked temporarily while they drain, freeing up more packet buffers for the newly active queue. If there are M queues, which are all very active, then their "steady state" queue lengths are $$Q^i(t) = T(t) = \frac{\alpha}{1 + \alpha \cdot M} \cdot B \quad (3)$$

The total buffer space used is $$\frac{\alpha \cdot M \cdot B}{1 + \alpha \cdot M} \quad (4)$$

In the worst case (i.e. M=1), the amount of unused memory is $(B - \alpha B/(1+\alpha)) = B/(1+\alpha)$.

The disclosed dynamic threshold system deliberately reserves a small amount of space in memory by not allocating it to any currently active output queue. This spare buffer space serves several functions. For example, the spare buffer space provides a cushion during transient periods when an output queue first becomes active and needs buffer space. This reduces packet loss during such transient periods.

When an output queue has such a load increase and begins taking over some of the spare buffer space, this action signals the buffer allocation mechanism that the load conditions have changed and that an adjustment of thresholds is now required. If there were not such built-in spare buffering, then the packet arrival rates and/or loss rates of the individual output queues would have to be monitored to determine when load conditions had changed.

The threshold value is very easy to compute, since it is based on the total buffer occupancy of the switch.

MULTIPLE-PRIORITY DYNAMIC QUEUE THRESHOLDS

In another embodiment, the dynamic queue thresholds are applied to a system with multiple space (loss) priorities. The space priority classes are assigned numerical labels 0 through P, following convention by assigning small numerical labels to the more important ("higher priority") classes. For example, when there are two classes, Class 0 packets belong to the loss-sensitive class, while Class 1 packets can tolerate higher packet loss rates.

The single-priority dynamic queue threshold system and method admits packets of priority p to queue i if:

$$Q^i(t) < T(t) = \alpha \cdot (B - Q(t)) \quad (5)$$

There are four ways to incorporate space priorities here:

1. vary the effective buffer size B according to priority level, such that Eq. (5) becomes:

$$Q^i(t) < T_p(t) = \alpha \cdot (B_p - Q(t));$$

2. vary the factor $\alpha$ according to priority level, such that Eq. (5) becomes:

$$Q^i(t) < T_p(t) = \alpha_p \cdot (B - Q(t));$$

3. instead of comparing the threshold T(t) to the queue length $Q^i(t)$, compare it to the number $Q^i_p(t)$ of priority p packets in queue i, such that Eq. (5) becomes:

$$Q^i_p(t) < T(t) = \alpha \cdot (B - Q(t));$$

or compare T(t) to $$\sum_{q \leq p} Q^i_q(t) \quad (6)$$

in which case Eq. (5) becomes:

$$\sum_{q \leq p} Q^i_q(t) < T(t) = \alpha \cdot (B - Q(t)) \quad (7)$$

4. replace the total buffer occupancy Q(t) with the number $Q_p(t)$ of packets of priority p; in which case Eq. (5) becomes:

$$Q^i(t) < T_p(t) = \alpha \cdot (B - Q_p(t)) \quad (8)$$

or replace Q(t) with $$\sum_{q \leq p} Q^i_q(t) \quad (9)$$

in which case Eq. (5) becomes:

$$Q^i(t) < T_p(t) = \alpha \cdot \left( B - \sum_{q \leq p} Q^i_q(t) \right); \quad (10)$$

Some of these methods of priority incorporation may work better in combination, and many combinations of these four ways are possible.

In an exemplary embodiment implementing the first method above, for each priority level p, there is a corresponding parameter $B_p$ to which the total buffer occupancy Q(t) is compared, where:

$$0 < B_p < B_{p-1} < \ldots < B_2 < B_1 < B_0 = B. \quad (11)$$

The effective buffer space $A_p$ available to packets of a priority level p is:

$$A_p = B_p - Q(t).$$

Whenever the total buffer occupancy Q(t) equals or exceeds $B_p$, i.e. whenever $A_p \leq 0$, no packets of priority p are admitted to the buffer. If Q(t) is less than $B_p$, then a packet of priority p may be admitted or blocked, depending on the length of the queue i that the packet would join. Specifically, packets of priority p are admitted to queue i if $$Q^i(t) < T_p(t) = \alpha \cdot A_p = \alpha \cdot (B_p - Q(t)) \tag{12}$$

The dynamics of this method are illustrated using two scenarios as follows: in the first scenario, a single overloaded queue i grows while the total buffer occupancy Q(t) is relatively stable. When $Q^i(t)$ crosses $\alpha \cdot (B_p - Q(t))$, no more priority P packets are admitted to queue i. If $Q^i(t)$ continues to grow to $\alpha \cdot (B_{p-1} - Q(t))$, packets of priority P-1 are also denied admission to queue i. Ultimately, if $Q^i(t)$ reaches $\alpha \cdot (B - Q(t))$, no more packets of any priority are admitted to queue i until the queue drains below this threshold again.

For the second scenario, assume that the total queue length Q(t) is growing, but not because of an extreme overload of any one queue. As Q(t) approaches $B_p$, first the longer queues have their priority P traffic blocked. By the time Q(t) reaches $B_p$, all queues have their priority P traffic blocked, because the individual queue length threshold $\alpha \cdot (B_p - Q(t))$ becomes zero at that point. During this buildup of Q(t) to $B_p$, those very long queues i that were the first to lose their priority P arrivals might also start having their packets of priority P-1 blocked, provided $Q^i(t) \geq \alpha \cdot (B_{p-1} - Q(t))$. If Q(t) exceeds $B_p$ and approaches $B_{p-1}$, eventually all queues have their traffic of priority P-1 blocked. As Q(t) crosses the various global threshold values $B_p$, traffic of the corresponding priority levels is blocked. Finally if $B_1 \leq Q(t) < B_0 = B$, then only packets of priority 0 are admitted to the buffer. As the buffer becomes nearly completely full, the dynamic threshold system and method blocks even priority 0 packets from extremely long queues. If all queues have sufficient priority 0 traffic demand to engage this highest level of threshold control, then the queue lengths tend toward equal values given by Eq. (3) above.

In the preferred embodiment, each space priority level p=0, 1, 2, . . . , P will have a control threshold value $T_p(t)$ to which a queue length $Q^i(t)$ is compared whenever a packet of space priority p wants to join queue i. These queue control thresholds are the same for all queues, so there are only P+1 different queue control threshold values 32 to store and maintain in memory 24 associated with the processor 18.

In determining the available free space in the memory, the queue control threshold setting $T_0$ for the highest priority class 0 is a function of the quantity $A_0 = (B_0 - Q(t)) = (B - Q(t))$. This is simply the free space, which is the length of the free list, i.e. the list of unoccupied packet buffers in the shared memory. For general priority level p, the threshold setting $T_p$ is a function of $A_p = (B_p - Q(t))$, the free space available for packets of class p. There are several ways to compute this quantity $A_p$:

(i) use one counter for each of the space priority classes p. This counter is initialized to $B_p$ and counts up or down for every packet departure or arrival respectively;

(ii) subtract a constant from the length of the free list as follows:

$(B_p - Q(t)) = (B - Q(t)) - (B - B_p).$

In order to facilitate implementation, the dynamic threshold system and method may restrict the choice of factors $\alpha$ to integer powers of 2 ( . . . , ⅛, ¼, ½, 1, 2, 4, 8, . . . ), where the integer power may be positive, negative, or zero; that is, $\alpha$ may equal $2^0$ which equals 1. It is understood that other factors $\alpha$ may also be used. In the case of $\alpha$ as a power of 2 and $\alpha \neq 1$, the thresholds $T_p(t)$ given by Eq. (12) above can be obtained by shifting $A_p$ either left or right using a shifter 36 as in FIG. 1.

Figure 2:
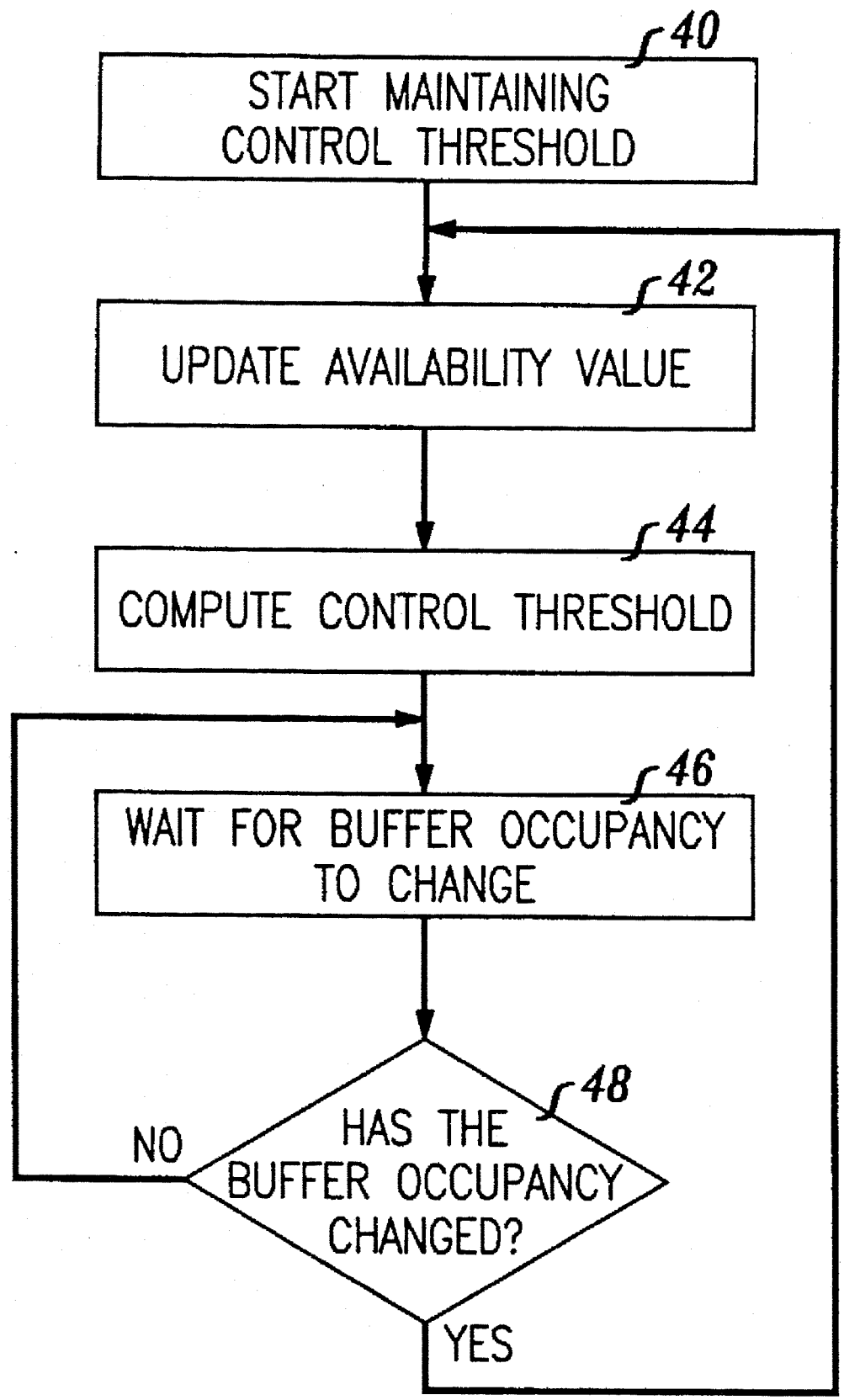
FIG. 2 illustrates a flow diagram of the portion of the disclosed dynamic threshold system and method that computes the control thresholds.

The dynamic threshold method has three primary steps which are performed concurrently: maintaining a count of the length of each output port queue; maintaining a set of control thresholds, one for each packet priority level; and regulating the admission of packets to the memory. The length count for an output port queue is updated whenever a packet is written into or read from that output port queue. The process for maintaining control threshold values is illustrated in FIG. 2. This process starts in step 40 whenever the occupancy of the shared memory changes, due to a packet being written into or read out from any output port queue in the shared memory. Step 42 updates the availability value $A_p(t)$ for each packet priority level p, based upon the current total occupancy Q(t) of the shared memory: $A_p(t) = B_p - Q(t)$. Then step 44 computes the control threshold value $T_p(t)$ for each packet priority level p; where the threshold is taken to be a multiple or fraction $\alpha$ of the current availability value $A_p(t)$:

$$T_p(t) = \alpha \cdot A_p(t).$$

The method waits at step 46 until the total buffer occupancy changes again, at which time the process continues in step 48 to loop back and continue to update the availability values in step 42.

Figure 3:
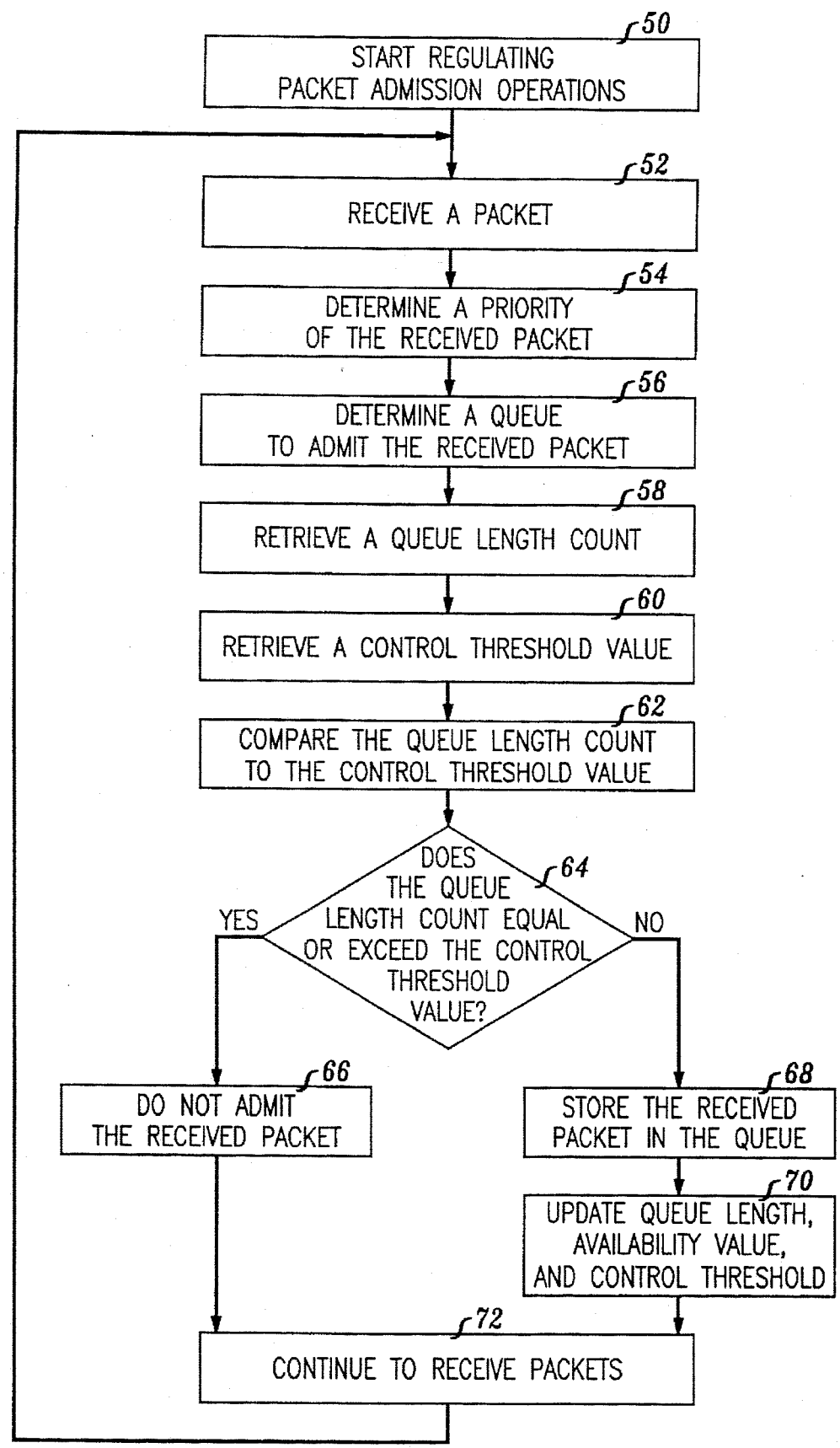
FIG. 3 illustrates a flow diagram of the portion of the disclosed dynamic threshold system and method that regulates packet admission.

FIG. 3 illustrates the operation that regulates packet admission. First the method starts operation in step 50, and then an arriving packet is received at an input port in step 52. Then its priority p is determined in step 54, and the output port queue i that the packet would join is determined in step 56. In steps 58 and 60, respectively, the length count $Q^i(t)$ for output port queue i and the control threshold value $T_p(t)$ for priority p are retrieved from the memory, and then these two quantities are compared in step 62. If the comparison is not favorable for admission; i.e. the queue length count equals or exceeds the control threshold value, then the received packet is not admitted to the shared memory in step 66. However, if the comparison is favorable for admission in step 64; i.e. the queue length count is less than the control value, then the received packet is admitted and stored in the appropriate output port queue in step 68. In step 70, the insertion of the packet into its output port queue causes the maintenance steps described above to update the length count for that output port queue and to update the availability values and control thresholds for all priority levels. In step 72, the method prepares to receive more packets by looping back to step 52.

In the exemplary embodiment described above, the disclosed dynamic threshold system and method are illustrated in conjunction with fixed-length ATM packets. In alternative embodiments, the disclosed dynamic threshold system and method may also be used in conjunction with any buffered communications, including systems with fixed packet lengths other than the ATM standard length of 53 bytes and systems with variable-length packets.

In the exemplary embodiment described above, the disclosed dynamic threshold system and method are illustrated for a single-stage switch. In another alternative embodiment, the disclosed dynamic threshold system and method may also be used in conjunction with multi-stage switches formed by connecting single-stage switches with other single-stage switches and/or multiplexers and demultiplexers. Each component single-stage switch or multiplexer or demultiplexer could use the dynamic threshold system and method to manage its own shared memory. For multiplexers, the dynamic thresholds are used to allocate memory among packets received from the competing input ports.

In the exemplary embodiment described above, the disclosed dynamic threshold system and method are illustrated for output port queues. In an additional alternative embodiment, the disclosed dynamic threshold system and method may also be used in a switch with scheduling classes (e.g., delay priority classes). In such a switch, packets destined for the same output port but having different scheduling classes are queued separately. Dynamic thresholds would be used to allocate space among all the scheduling-class queues for all the output ports in the switch.

In the exemplary embodiment described above, the disclosed dynamic threshold system and method are illustrated by blocking admission of all packets to queues over threshold. In further alternative embodiments, the disclosed dynamic threshold system and method may be used in conjunction with other controls such as rate control. Moreover, if a signaling scheme is also included, then such controls may be exercised at any point along the route between the traffic source and the congested switch.

While the disclosed dynamic threshold system and method has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A packet communications system comprising:
   a packet processing circuit for processing packets as incoming and outgoing packets, for receiving an incoming packet on an input port and for transmitting an outgoing packet on an output port, with the packets belonging to at least one space priority class and to at least one scheduling class;
   a memory for storing the processed packets in queues; and
   a processor using control logic and configured for controlling the packet processing circuit to process the packets and for allocating memory among the queues by computing an availability value based on the occupancy of the memory, by computing a control parameter as a function of the availability value, by computing the lengths of the queues, and by controlling admittance of each incoming packet to its queue based on the length of the queue being less than the control parameter.

2. The packet communications system of claim 1 wherein the packet processing circuit processes packets of variable lengths.

3. The packet communications systems of claim 1 wherein the packet processing circuit processes packets of fixed lengths.

4. The packet communications system of claim 1 wherein the packets are asynchronous transfer mode (ATM) cells.

5. The packet communications system of claim 1 wherein the packet processing circuit is connected to a plurality of input ports; and
   the processor controls the packet processing circuit to perform packet multiplexing functions.

6. The packet communications system of claim 1 wherein the packet processing circuit is connected to a plurality of output ports; and
   the processor controls the packet processing circuit to perform packet demultiplexing functions.

7. The packet communications system of claim 1 wherein the packet processing circuit is connected to a plurality of input ports and a plurality of output ports; and
   the processor controls the packet processing circuit to perform switching functions.

8. The packet communications system of claim 1 wherein the queue of the incoming packet includes packets destined for the same output port as the incoming packet.

9. The packet communications system of claim 1 wherein the queue of the incoming packet includes packets destined for the same output port as the incoming packet and having the same priority class as the incoming packet.

10. The packet communications system of claim 1 wherein the queue of the incoming packet includes packets destined for the same output port as the incoming packet and having one of the same space priority class as in the incoming packet and a space priority class with a higher priority according to a predetermined order than the incoming packet.

11. The packet communications system of claim 1 wherein the queue of the incoming packet includes packets destined for the same output port as the incoming packet and having the same scheduling class as the incoming packet.

12. The packet communications system of claim 1 wherein the queue of the incoming packet includes packets that arrived over the same input port as the incoming packet.

13. The packet communications system of claim 1 wherein the processor uses the control parameter as a threshold, and the processor denies the incoming packet admission to its queue if the length of the queue equals or exceeds the control parameter.

14. The packet communications system of claim 13 wherein the processor includes a comparator for determining whether the queue length equals or exceeds the control parameter.

15. The packet communications system of claim 1 wherein the processor computes the control parameter to be at least one of the availability value, a multiple of the availability value, and a fraction of the availability value.

16. The packet communications system of claim 15 wherein the particular multiple and fraction used depends on the space priority of the incoming packet.

17. The packet communications system of claim 15 wherein the multiple and fraction is a positive and negative integer power of 2, respectively.

18. The packet communications system of claim 17 wherein the processor includes a shift register for determining the product of the power of 2 and the availability value.

19. The packet communications system of claim 1 wherein the processor computes the availability value as the difference between a measure of effective buffer capacity and a measure of memory occupancy.

20. The packet communications system of claim 19 wherein the measure of effective buffer capacity depends on the space priority of the incoming packet.

21. The packet communications system of claim 19 wherein the measure of memory occupancy depends on the space priority of the incoming packet.

22. The packet communications system of claim 21 wherein the measure of memory occupancy is the number of packets in the memory with the same space priority class as the incoming packet.

23. The packet communications system of claim 21 wherein the measure of memory occupancy is the number of packets in the memory with at least one of the same space priority class as the incoming packet and a space priority class with a higher priority according to a predetermined order than the incoming packet.

24. A method for allocating memory space among queues in a packet communications system, the queues including packets of at least one space priority class and of at least one scheduling class, the method comprising the steps of:

maintaining counts of the lengths of the queues;

maintaining an availability value associated with the occupancy of the memory, and a control parameter that is a function of the availability value;

processing an incoming packet including at least one of the steps of admitting the incoming packet to its queue and rejecting the incoming packet according to the condition of the length of the queue being less than the control parameter.

25. The method of claim 24 wherein the step of processing includes processing asynchronous transfer mode (ATM) cells as the incoming packets.

26. The method of claim 24 including the step of associating the queue of the incoming packet with the space priority class of the incoming packet.

27. The method of claim 24 including the step of associating the queue of the incoming packet with the scheduling class of the incoming packet.

28. The method of claim 24 including the step of updating the length count of any queue immediately whenever the step of processing admits or removes a packet from the queue.

29. The method of claim 24 wherein the step of maintaining an availability value includes the step of maintaining an amount of unused memory as the availability value.

30. The method of claim 24 including the step of setting the control parameter equal to at least one of the availability value, a fraction of the availability value, and a multiple of the availability value.

31. The method of claim 24 including the step of associating the control parameter with the space priority class of the incoming packet.

32. The method of claim 24 wherein the step of admitting uses the control parameter as a threshold on the queue length of the incoming packet, and the step of rejecting is performed if the queue length equals or exceeds the control parameter.

33. The method of claim 24 including the step of updating the availability value and the control parameter immediately whenever the step of processing admits or removes a packet from the memory.

34. The method of claim 24 wherein the steps of admitting and rejecting the incoming packet includes the steps of:

receiving the incoming packet;

determining the space priority class of the incoming packet;

determining the scheduling class of the incoming packet;

determining the queue that the packet would join;

determining the length of the queue;

determining the control parameter;

making an admission decision whether or not to admit the incoming packet to its queue; and storing the incoming packet in its queue in the memory if the admission decision is favorable.

35. A packet communications module comprising:

a packet processing circuit for processing packets as incoming and outgoing packets to receive an incoming packet on an input port and to transmit an outgoing packet on an output port;

a memory for storing the processed packets in an output port queue associated with the output port;

a processor using stored programs and configured for controlling the packet processing circuit to process the packets, for computing availability values based on the total occupancy of the memory, for computing control parameters as functions of the availability values, for computing an output port queue length, and for controlling admittance of packets to the output port queue based on the output port queue lengths being less than corresponding control parameters to allocate memory space in the memory for admitted packets.

36. A system for allocating memory space in an asynchronous transfer mode (ATM) switch for switching ATM packets, the system comprising:

the ATM switch for processing ATM packets as incoming and outgoing ATM packets to receive incoming ATM packets on a plurality of input ports and to transmit outgoing ATM packets on a plurality of output ports;

a memory for storing the processed ATM packets in an output port queue;

a processor having associated memory and using stored programs and configured for controlling the ATM switch to process the ATM packets, for computing availability values based on the total occupancy of the memory, for computing control parameters as functions of the availability values, for computing an output port queue length, and for controlling admittance of ATM packets to the output port queue based on the output port queue lengths being less than corresponding control parameters to allocate memory space in the memory for admitted ATM packets.

37. A method for allocating memory space in a shared memory of an asynchronous transfer mode (ATM) switch, the method comprising the steps of:

receiving an packet;

determining a control parameter as a function of an occupancy value of the shared memory; and storing the packet in a queue in the memory based on a queue length of the queue being less than the control parameter.

38. A method for allocating memory space among a plurality of output queues in a shared memory of an asynchronous transfer mode (ATM) switch module, the method comprising the steps of:

determining a first count from an occupancy of the shared memory;

receiving an ATM packet from an input port;

determining a priority setting of the received packet;

determining a first queue length of the first queue corresponding to the priority setting;

storing the ATM packet in the shared memory responsive to the condition of the first queue length being less than a predetermined multiple of the first count.

* * * * *